(12) United States Patent
Bao et al.

(10) Patent No.: US 10,437,576 B2
(45) Date of Patent: Oct. 8, 2019

(54) AUTOMATIC APPLICATION DOWNLOAD AND LAUNCH DURING PRESENTATION OF CONTENT

(71) Applicant: Verizon Patent and Licensing Inc., Arlington, VA (US)

(72) Inventors: Guanqun Bao, Sunnyvale, CA (US); Manish Sharma, San Jose, CA (US); Devin Blong, Penngrove, CA (US); Kevin Flores, San Jose, CA (US); Tushar Chaudhary, Mountain View, CA (US); Gaurav Gupta, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 432 days.

(21) Appl. No.: 14/755,566

(22) Filed: Jun. 30, 2015

(65) Prior Publication Data
US 2017/0003945 A1    Jan. 5, 2017

(51) Int. Cl.
*G06F 8/61*      (2018.01)
*H04L 29/08*     (2006.01)
*G06F 3/0488*    (2013.01)

(52) U.S. Cl.
CPC ............ *G06F 8/61* (2013.01); *G06F 3/04886* (2013.01); *H04L 67/34* (2013.01)

(58) Field of Classification Search
CPC ..... G06F 8/60; G06F 8/61; G06F 8/65; G06F 8/67; G06F 8/68; G06F 3/04886; H04L 67/34
See application file for complete search history.

(56) References Cited

U.S. PATENT DOCUMENTS

| | | | |
|---|---|---|---|
| 9,152,309 B1 * | 10/2015 | Arrehn | G06F 3/04845 |
| 9,317,878 B2 * | 4/2016 | D'Auria | G06Q 30/0631 |
| 9,335,983 B2 * | 5/2016 | Breiner | G06F 8/61 |
| 9,430,120 B2 * | 8/2016 | Cranfill | G06F 3/0482 |
| 9,454,783 B2 * | 9/2016 | Ho | H04L 65/60 |
| 10,255,249 B1 * | 4/2019 | Yu | G06F 17/212 |
| 2007/0282893 A1 * | 12/2007 | Smith | G06F 16/44 |
| 2011/0113354 A1 * | 5/2011 | Thiyagarajan | G09G 5/14 |
| | | | 715/760 |
| 2012/0036048 A1 * | 2/2012 | Robb | G06O 30/02 |
| | | | 705/27.2 |
| 2013/0065526 A1 * | 3/2013 | Pottier | H04L 67/34 |
| | | | 455/41.2 |
| 2013/0144934 A1 * | 6/2013 | Swett | G06F 8/61 |
| | | | 709/203 |

(Continued)

*Primary Examiner* — Ziaul A Chowdhury

(57) ABSTRACT

Techniques described herein may allow for the automatic downloading, installing, and/or launching of applications (commonly referred to as "apps"), during the presentation of content. For example, a user device (e.g., a smart phone) may play video content, such as a trailer for a video game app. During the presentation of the trailer, a button, to install the video game app, may be presented. Based on a single click of the button, the video game app may be downloaded and installed. The app may further be launched as soon as it is installed, and/or as soon as the trailer ends. Some techniques described herein may be applicable for the automatic downloading, installing, and/or launching of an application on a wearable device while another device presents content, or vice versa.

20 Claims, 12 Drawing Sheets

(56) References Cited

U.S. PATENT DOCUMENTS

| | | | | |
|---|---|---|---|---|
| 2013/0298034 A1* | 11/2013 | Ramachandran | G06F 9/4443 | 715/748 |
| 2013/0332318 A1* | 12/2013 | D'Auria | G06Q 30/0241 | 705/27.1 |
| 2013/0332886 A1* | 12/2013 | Cranfill | G06F 3/0482 | 715/835 |
| 2014/0018155 A1* | 1/2014 | Nelson | G07F 17/3225 | 463/25 |
| 2014/0068593 A1* | 3/2014 | McErlane | G06F 8/61 | 717/171 |
| 2014/0317303 A1* | 10/2014 | Toprani | H04L 65/1003 | 709/227 |
| 2014/0357312 A1* | 12/2014 | Davis | G06F 3/0481 | 455/550.1 |
| 2014/0359602 A1* | 12/2014 | Sawaya | G06F 8/61 | 717/176 |
| 2014/0362293 A1* | 12/2014 | Bakar | H04N 5/4401 | 348/552 |
| 2014/0379913 A1* | 12/2014 | Niimura | H04L 67/34 | 709/225 |
| 2015/0007131 A1* | 1/2015 | Ortiz | G06F 8/38 | 717/109 |
| 2015/0033219 A1* | 1/2015 | Breiner | G06F 8/61 | 717/178 |
| 2015/0147065 A1* | 5/2015 | Civelli | G08C 23/04 | 398/107 |
| 2015/0178059 A1* | 6/2015 | Lindheimer | G06F 8/61 | 717/178 |
| 2015/0234892 A1* | 8/2015 | Malca | G06F 17/30424 | 707/755 |
| 2015/0301718 A1* | 10/2015 | Trollope | G06F 17/30755 | 715/716 |
| 2015/0371263 A1* | 12/2015 | Kagan | G06Q 30/0256 | 705/14.54 |
| 2016/0085536 A1* | 3/2016 | An | G06F 3/04817 | 717/171 |
| 2016/0125677 A1* | 5/2016 | Williams | G06F 1/163 | 340/5.81 |
| 2016/0134737 A1* | 5/2016 | Pulletikurty | G06F 3/0227 | 715/735 |
| 2016/0142413 A1* | 5/2016 | Diep | G06F 9/44526 | 726/4 |
| 2016/0162949 A1* | 6/2016 | Malca | G06Q 30/0262 | 705/14.59 |
| 2016/0192108 A1* | 6/2016 | Chaudhary | G06F 8/61 | 455/411 |
| 2016/0203519 A1* | 7/2016 | Ketchpaw | G06Q 30/0267 | 705/14.64 |
| 2016/0210665 A1* | 7/2016 | Champy | G06Q 30/0241 | |
| 2016/0239578 A1* | 8/2016 | Evans | G06F 17/30876 | |
| 2016/0247207 A1* | 8/2016 | Yeom | G06Q 30/02 | |
| 2016/0277781 A1* | 9/2016 | Lennon | H04N 21/2743 | |

* cited by examiner

AUTOMATIC APPLICATION DOWNLOAD AND LAUNCH DURING PRESENTATION OF CONTENT

BACKGROUND

Content providers, such as video streaming services, video game companies, movie companies, or the like, often employ multiple different methods of delivering content and/or advertising their products. For example, a movie company may provide video advertising content (sometimes referred to as a "trailer"), which may increase potential customers' interest in a movie. As another example, a video game company may provide a trailer that advertises a video game. When a user is interested in a particular product, that user may typically need to make a selection to download the product (e.g., select a video game, a movie, a smartphone application, etc. in a virtual store or marketplace), and then manually select, activate, or open the product.

DETAILED DESCRIPTION OF PREFERRED EMBODIMENTS

The following detailed description refers to the accompanying drawings. The same reference numbers in different drawings may identify the same or similar elements.

Figure 1A:
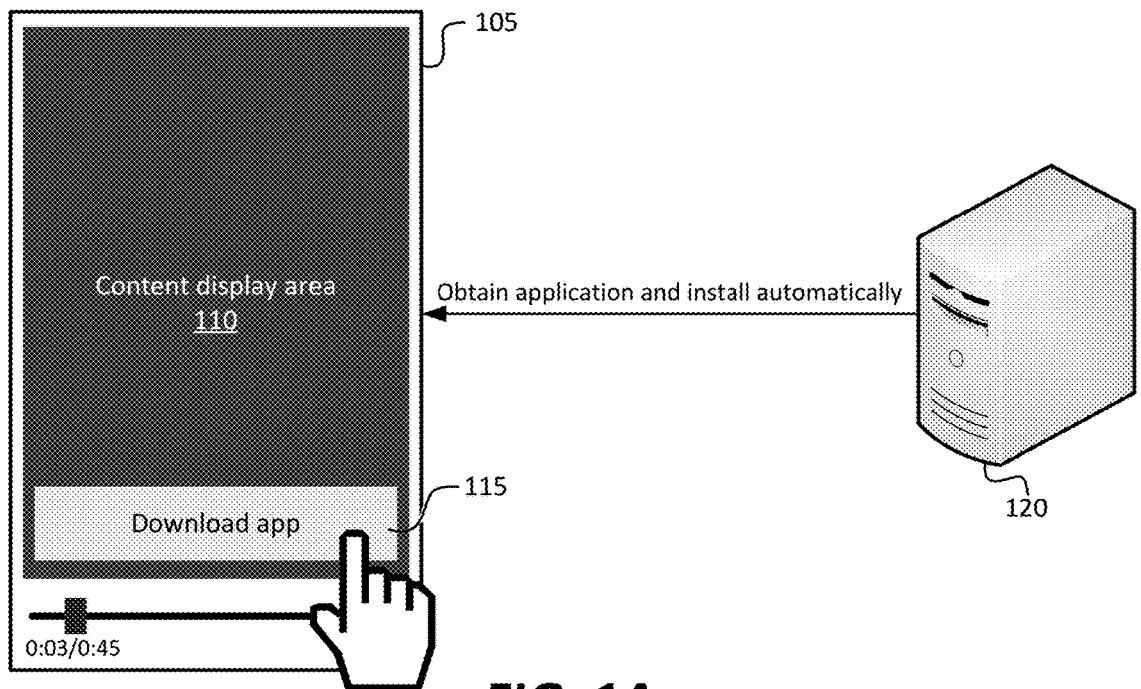
FIGS. 1A and 1B illustrate an example overview of an implementation described herein, in which content is delivered to a user device during the presentation of content, installed on the user device while the content is presented, and opened automatically once installed.

Some implementations, described herein, may provide for the automatic downloading, installing, and launching of applications, during the presentation of content. The downloading, installing, and launching of applications may be performed by a user device (e.g., a smartphone, a tablet computer, a wearable device, etc.). For example, as shown in FIG. 1, user interface 105 may be displayed on a user device, such as a smartphone. User interface 105 may include a visual display area (e.g., content display area 110), on which content (e.g., video content) may be displayed. A visual selection option (e.g., button 115) may be presented on user interface 105 (e.g., overlaid on top of content display area 110, in this example).

As shown, when button 115 is selected, the user device may obtain an application (e.g., a smartphone application, or "app") from an application repository (e.g., application repository 120). For example, the user device may obtain the application via a network, such as via a cellular network (e.g., a Long-Term Evolution ("LTE")) network or a wireless local area network (e.g., a WiFi network). In accordance with some implementations, the user device may automatically install the application (e.g., without prompting or notifying the user regarding the installation, after the user has selected button 115). Further, in some implementations, the application may be installed while content continues to play, uninterrupted, in content display area 110.

Figure 1B:
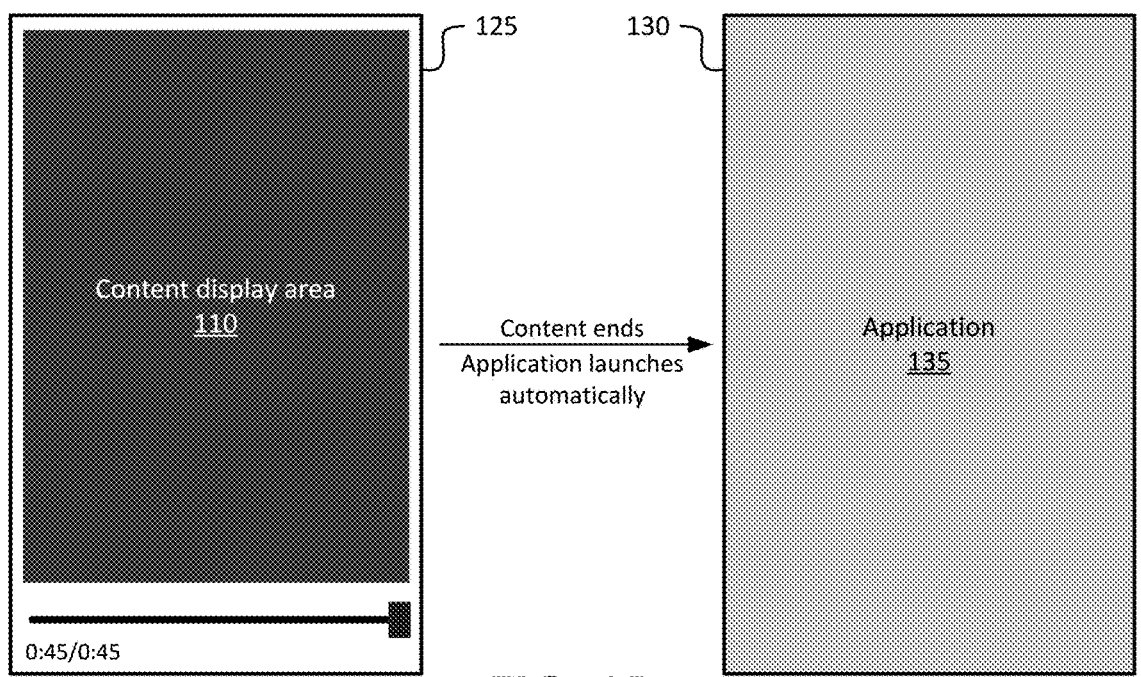

As shown in FIG. 1B, user interface 125 may be displayed on the user device at a time subsequent to the display of user interface 105. Specifically, user interface 125 may correspond to an end time of the content displayed in content display area 110. For instance, in the example of FIGS. 1A and 1B, the content may have a duration of 45 seconds, and user interface 125 may include a time slider that shows that the content has ended (e.g., may show "0:45/0:45").

As shown in user interface 130, once the content ends, the downloaded application may be launched automatically (e.g., based on the ending of the content, and without a request from the user to launch the application after the content ends), and application display area 135 may be displayed. Application display area 135 may include visual content and/or other types of content associated with the application.

The automatic downloading, installing, and/or launching of applications, according to implementations described herein, may provide users with a seamless and efficient way of accessing content that they deem desirable. Enhancing the user experience of such application downloads may aid content providers in monetizing such application downloads, such as by increasing the quantity of application downloads, which may allow for more direct monetization opportunities (e.g., charging for application downloads) and/or for more indirect monetization opportunities (e.g., generating advertising revenue, enhancing brand image and awareness, etc.).

Figure 2:
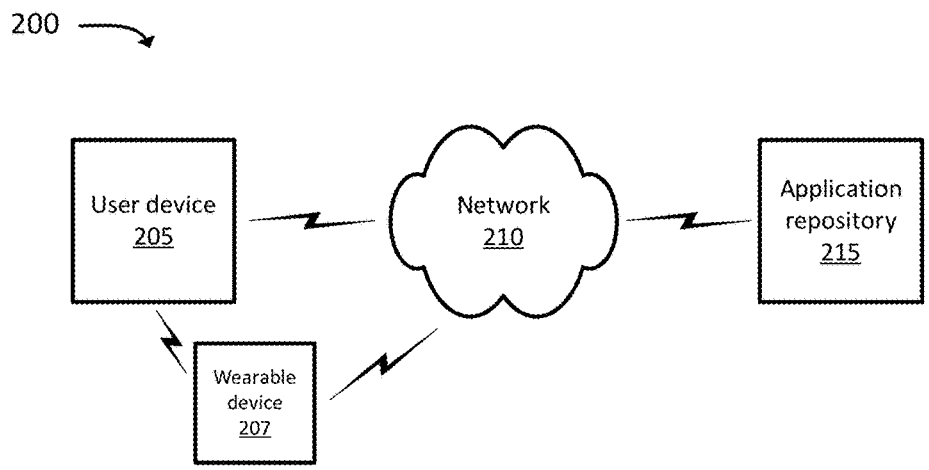
FIG. 2 illustrates an example environment, in which systems and/or methods, described herein, may be implemented.

FIG. 2 illustrates an example environment 200, in which systems and/or methods described herein may be implemented. As shown in FIG. 2, environment 200 may include one or more user devices 205, network 210, and application repository 215.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Devices of environment 200 may interconnect with each other and/or other devices via wired connections, wireless connections, or a combination of wired and wireless connections. Also, while "direct" connections are shown in FIG. 2 between certain devices, some devices may communicate with each other via network 210 (and/or another network).

User device 205 may include any computation and communication device that is capable of communicating with one or more networks (e.g., network 210). For example, user device 205 may include a radiotelephone, a personal communications system ("PCS") terminal (e.g., a device that combines a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a television, a set-top device ("STD"), a personal gaming system, a wearable device, and/or another type of computation and communication device. User device 205 may include logic and/or hardware circuitry to communicate via one or more "short range" wireless protocols, such as WiFi (e.g., based on an Institute of Electrical and Electronics Engineers ("IEEE") 802.11-based standard), Bluetooth, Near Field Communications ("NFC"), ZigBee (e.g., based on an IEEE 802.15.4-based standard), or the like. In some implementations, user device 205 may be in communication with another device (e.g., wearable device 207) via a short range wireless protocol. User device 205 may also include logic and/or hardware circuitry to communicate via a wireless telecommunications protocol, such as LTE, Third Generation Partnership Project ("3GPP") Third Generation ("3G"), Code Division Multiple Access ("CDMA") 2000 1x, and/or another wireless telecommunications protocol. As described below, user device 205 may include logic and/or hardware circuitry to automatically download, install, and/or launch applications during the presentation of content.

Wearable device 207 may include a computation and communication device that is capable of communicating with one or more devices (e.g., user device 205). In some implementations, wearable device 207 may be capable of communicating with one or more networks (e.g., network 210). Wearable device 207 may include, for example, a "smart" watch, a "clip-on" type device that a user can attach to an article of clothing, "smart" glasses, etc. Wearable device 207 may include short-range radio circuitry and/or logic, via which wearable device 207 may communicate with user device 205. Additionally, or alternatively, wearable device 207 may include radio circuitry and/or logic, via which wearable device 207 may communicate with network 210.

Network 210 may include one or more wired and/or wireless networks. For example, network 210 may include an Internet Protocol ("IP")-based packet data network ("PDN"), a wide area network ("WAN") such as the Internet, a private enterprise network, and/or one or more other networks. Network 210 may include, and/or be communicatively coupled to, one or more radio access networks ("RANs"), which may provide wireless connectivity to user device 205. Such RANs may operate at licensed frequencies (e.g., frequencies, the use of which are regulated by a governmental entity that controls the use of such frequencies) and/or unlicensed frequencies (e.g., frequencies, the use of which are not regulated by a governmental entity). Licensed frequencies may correspond to "cellular" radio access technologies ("RATs"), such as LTE, 3GPP Second Generation ("2G"), 3GPP 3G, CDMA2000 1x, or the like. Unlicensed frequencies may correspond to wireless local area network ("WLAN") and/or personal area network ("PAN")-type RATs, such as WiFi, Bluetooth, Zigbee, or the like. Network 210 may be connected to one, and/or may include, or more other networks, such as a public switched telephone network ("PSTN"), a public land mobile network ("PLMN"), and/or another network.

Application repository 215 may include one or more devices (e.g., a single physical device or a distributed set of devices) that provide applications (e.g., smartphone, tablet, or wearable device "apps") to user device 205. For example, as described below, application repository 215 may provide such applications to user device 205, via network 210, based on a request from user device 205.

Figure 3:
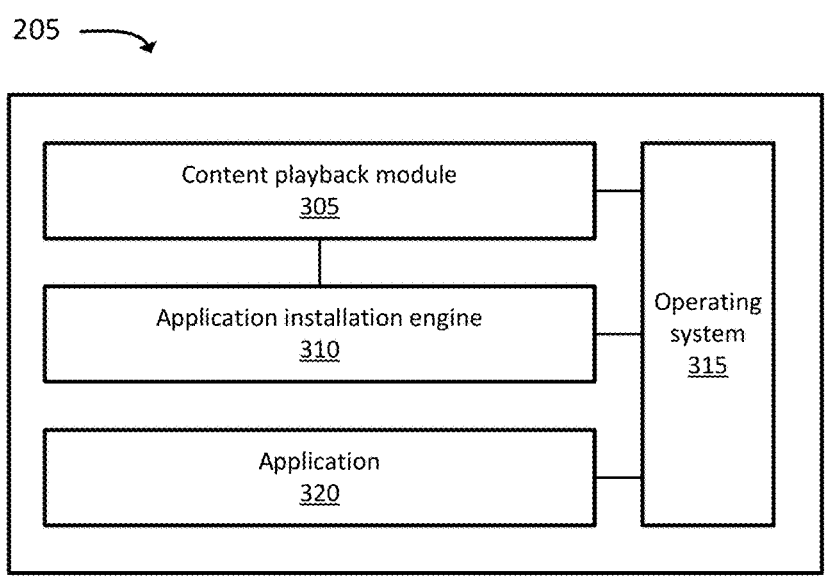
FIG. 3 illustrates example components of a user device, in accordance with some implementations described herein.

FIG. 3 illustrates example functional components of user device 205, as well as example signals that relate to the automatic downloading, installing, and launching of applications. As shown, user device 205 may include content playback module 305, application installation engine 310, and operating system 315. In some implementations, user device 205 may include additional, fewer, different, and/or differently arranged components than shown in FIG. 3. The components shown in FIG. 3 may be implemented as hardware circuitry, software logic, or a combination of hardware and software.

Content playback module 305 may present (e.g., via a display device associated with user device 205), content, such as video content. For example, content playback module 305 may be, may include, or may be implemented by a web browser, a video playback application, and/or another type of application. In some implementations, content playback module 305 may present one or more selectable options (e.g., buttons, thumbnails, icons, links, and/or other selectable visual representations), that a user may select in order to download, install, and/or launch an application.

For example, content playback module 305 may receive code (e.g., Hypertext Markup Language ("HTML") code, Extensible Markup Language ("XML") code, Javascript code, and/or some other type of code) that includes information regarding an application. For instance, the code may indicate a resource locator and/or another identifier associated with the application, such as a Uniform Resource Locator ("URL"), an IP address, an application name, and/or a file name associated with the application. The resource locator may, in some implementations, include a reference to one or more files stored by application repository 215.

In some implementations, the code may include instructions and/or specifications on how a selectable option (e.g., a button), to download the application, should be presented. For instance, the code may include a size, color, typeface, etc., associated with the selectable option. As another example, the code may indicate one or more times or time ranges, during the presentation of the content, during which the selectable option should be presented. As yet another example, the code may indicate a graphical position (e.g., whether the selectable option should be overlaid on the content, a position where the selectable option should be displayed, etc.). For example, assume that a particular content item is a 45-second long video with a resolution of 640×480 pixels. In this example, the code may specify that a button, with a resolution of 600×40 pixels, should be overlaid on the video, at the position (0x0) (e.g., the bottom left edge), from the beginning of the video until ten seconds have elapsed in the video.

In some implementations, the code may indicate that the application should be downloaded automatically, upon presentation of the content. In other examples, the code may indicate that the application should be downloaded automatically at a particular time during the presentation of the content (e.g., after the content has been presented for ten seconds). In some such implementations, the code may not include a selectable option for the user to select. The code may, in some implementations, specify that a notification should be provided to the user, indicating that the application is being downloaded automatically.

Application installation engine 310 may communicate with content playback module 305 and operating system 315 through, for example, one or more application programming interfaces ("APIs"). Generally speaking, application installation engine 310 may obtain applications (e.g., as requested by a user, via content playback module 305) from application repository 215, and may instruct operating system 315 to install the obtained applications (and/or may otherwise communicate with operating system 315, in order to install the applications on user device 205). For example, content playback module 305 may receive a request, from content playback module 305, for a particular application. The request may include resource locator information associated with the application (e.g., a URL, an IP address associated with application repository 215, etc.).

Operating system 315 may be an operating system installed (e.g., by a vendor or manufacturer of user device 205) on user device 205, which may control lower-level functionality of user device 205 (e.g., processor/memory management, installation or removal of applications, software-hardware interface functions, etc.). Application 320, shown in FIG. 3, represents the application, once installed on user device 205.

In some implementations, application installation engine 310 may receive some or all of the code, received by content playback module 305. For example, in some implementations, application installation engine 310 may receive HTML or XML code, associated with particular content, which includes locator information associated with application 320. In some implementations, application installation engine 310 may parse the HTML or XML code, and may obtain (e.g., download) application 320 from application repository 215 (e.g., may obtain one or more resources, such as files and/or other types of data associated with application 320).

Once the resources, associated with application 320, are obtained from application repository 215, application installation engine 310 may operate to install application 320 on user device 205. For instance, application installation engine 310 may provide resources (e.g., files), associated with application 320 and obtained from application repository 215, to operating system 315, as well as an instruction to install application 320. As another example, operating system 315 may provide an API, via which application installation engine 310 may be permitted and/or enabled to install application 320 on user device 205. Operating system 315 may notify, and/or application installation engine 310 may automatically detect, when application 320 has been installed, and may notify content playback module 305 and/or operating system 315 regarding the completion of the installation of application 320.

In some implementations, in response to the notification, content playback module 305 may provide information to application installation engine 310, indicating a current time point of the presentation of the content (e.g., how much time has elapsed since the beginning of the content, how much time is remaining, etc.). When providing the notification to operating system 315, application installation engine 310 may include the information indicating the current time point, which operating system 315 may pass to application 320.

Operating system 315 may, in response to receiving the notification, cause content playback module 305 to close, and application 320 to open (e.g., may launch application 320). That is, the presentation of content, via content playback module 305, may be interrupted, and application 320 may be presented on user device 205 instead. In some implementations, when application 320 has been passed the information regarding the current time point of the presentation of the content, application 320 may continue to present the content from the same time point. In this manner, the user may not perceive that the content is being presented via a different application (e.g., via application 320 instead of content playback module 305). In other examples, the user may perceive a slight pause, while application 320 is launched. In still other examples, a notification may be provided to the user, indicating that the application has been installed and launched.

While example operations and functionality of components 305-320 have been described above, other variations are possible. Some examples illustrating the above operations, and/or of variations on the above operations, are described below with respect to FIGS. 7 and 8.

Figure 4:
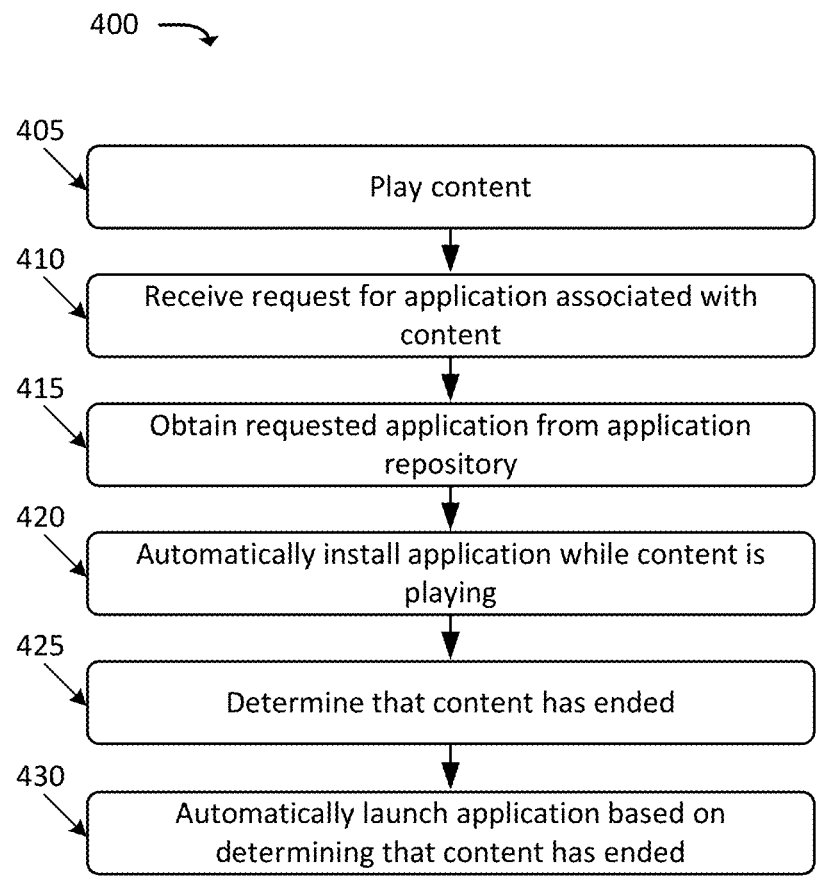
FIGS. 4-6 illustrate flowcharts of example processes for automatically downloading and installing applications, in accordance with some implementations described herein.
Figure 5:
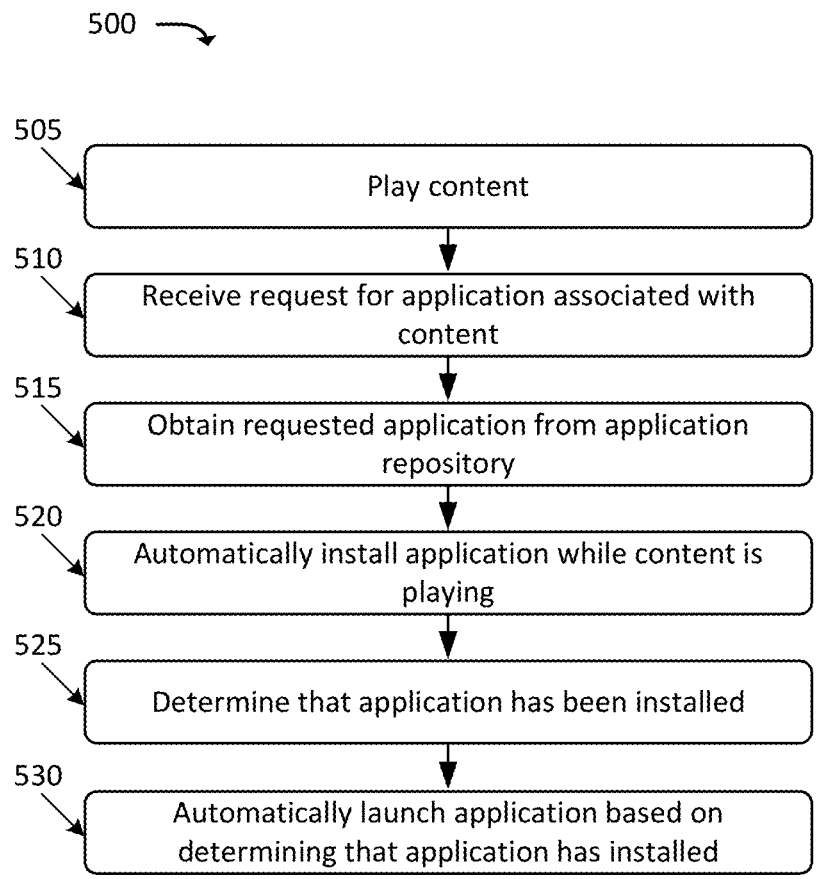
Figure 6:
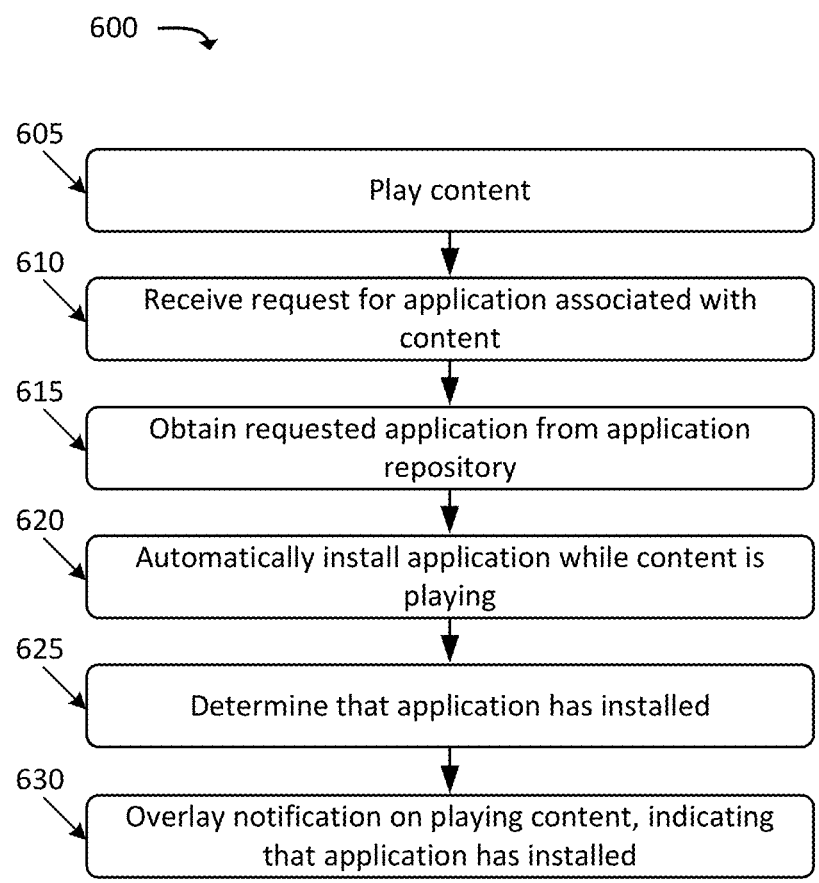

FIGS. 4-6 illustrate flowcharts of example processes 400, 500, and 600, respectively, for automatically downloading and installing applications, in accordance with some implementations described herein. In some implementations, some or all of processes 400, 500, and/or 600 may be performed by user device 205 (e.g., by one or more of components 305-320).

As shown in FIG. 4, process 400 may include playing (at 405) content. For example, as described above with respect to content playback module 305, user device 205 may play content, such as video content. As also mentioned above, user device 205 may, in some implementations, present a selectable option (e.g., a button), that a user of user device 205 may select to request the download and installation of an application.

Process 400 may also include receiving (at 410) a request for an application associated with the content. The application may be, for example, an application specified (e.g., by a content provider that provides the content, by an advertising partner of the content provider, and/or by some other entity) as being presented for download when the content is presented. For example, as described above with respect to content playback module 305 and application installation engine 310, user device 205 may receive a request from a user (e.g., via a selection of the selectable option) to obtain and install the application. As another example, user device 205 may automatically determine that the application should be installed (e.g., as specified by HTML code, XML code, and/or some other code associated with the content).

Process 400 may further include obtaining (at 415) the requested application from an application repository. For example, as described above with respect to application installation engine 310, user device 205 may obtain the application (e.g., files and/or other resources associated with the application) from application repository 215, via network 210. The request may include, for example, a URL and/or some other resource locator information included with the content.

Process 400 may additionally include automatically installing (at 420) the application while the content is playing. For example, as described above with respect to application installation engine 310 and operating system 315, user device 205 may install the obtained application. The installation may be "automatic" in that no further user interaction (e.g., after the selection of the selectable option) may be required for the application to be installed on user device 205.

Process 400 may also include determining (at 425) that the content has ended. For instance, content playback module 305 may notify application installation engine 310, via an API, that the content has ended. Based on this notification, application installation engine 310 may issue a request, to operating system 315, to launch the installed application. The request may also specify that content playback module 305 should be closed, or suspended, so that the application can be launched.

Process 400 may further include automatically launching (at 430) the application based on determining that the content has ended. In this manner, from the user's perspective, the downloading, installing, and launching of the application may be performed via one single click, while content (e.g., video content is being presented). Furthermore, from the user's perspective, the user may be able to watch the entire content before the application is automatically launched.

FIG. 5 illustrates another example process 500, via which an application can be automatically downloaded, launched, and installed. FIG. 5 includes some blocks that are similar to blocks shown in FIG. 4. For the sake of brevity, these similar blocks will not be explained in detail below.

As shown in FIG. 5, process 500 may include playing (at 505) content, receiving (at 510) a request for an application associated with the content (and/or automatically determining that the application should be installed), obtaining (at 515) the requested application from an application repository, and automatically installing (at 520) the application while the content is playing.

Process 500 may also include determining (at 525) that the application has installed. For example, application installation engine 310 may receive a notification, from operating system 315, indicating that the application has finished installing. Based on this notification, application installation engine 310 may issue a request, to operating system 315, to launch the installed application. In some implementations, application installation engine 310 may determine a present time position of the content (e.g., may receive such information from content playback module 305, via an API), and may include the present time position in the request to operating system 315. The request may also specify that content playback module 305 should be closed, or suspended, so that the application can be launched.

Process 500 may further include automatically launching (at 530) the application based on determining that the application has installed. In this manner, from the user's perspective, the downloading, installing, and launching of the application may be performed via one single click, while content (e.g., video content is being presented). Furthermore, from the user's perspective, the playing of the content, by content playback module 305, may be interrupted so that the application can be launched. In some implementations, the content may be resumed, in a seamless manner, in the launched application. In some implementations, the time position of the content may be used in other ways, other than resuming the presentation of the content. For example, different information and/or user interface elements (e.g., buttons, hyperlinks, etc.) may be presented to the user based on different time positions of the content.

FIG. 6 illustrates another example process 600, via which an application can be automatically downloaded, launched, and installed. FIG. 6 includes some blocks that are similar to blocks shown in FIGS. 4 and 5. For the sake of brevity, these similar blocks will not be explained in detail below.

As shown in FIG. 6, process 600 may include playing (at 605) content, receiving (at 610) a request for an application associated with the content (and/or automatically determining that the application should be installed), obtaining (at 615) the requested application from an application repository, automatically installing (at 620) the application while the content is playing, and determining (at 625) that the application has installed.

Process 600 may further include overlaying (at 630) a notification on the playing content, indicating that the application has installed. For example, application installation engine 310 may output an instruction (e.g., via an API) to content playback module 305, instructing content playback module 305 to present a notification that the application has been installed. The notification may be overlaid on the playing content, and/or may be presented in another manner. In some implementations, the notification may include a selectable option (e.g., a button) to launch the application. Upon selection of the option, content playback module 305 may send a request to application installation engine 310, requesting that the application be launched, and application installation engine 310 may pass the request to operating system 315, in order to effect the launch of the application.

Figure 7:
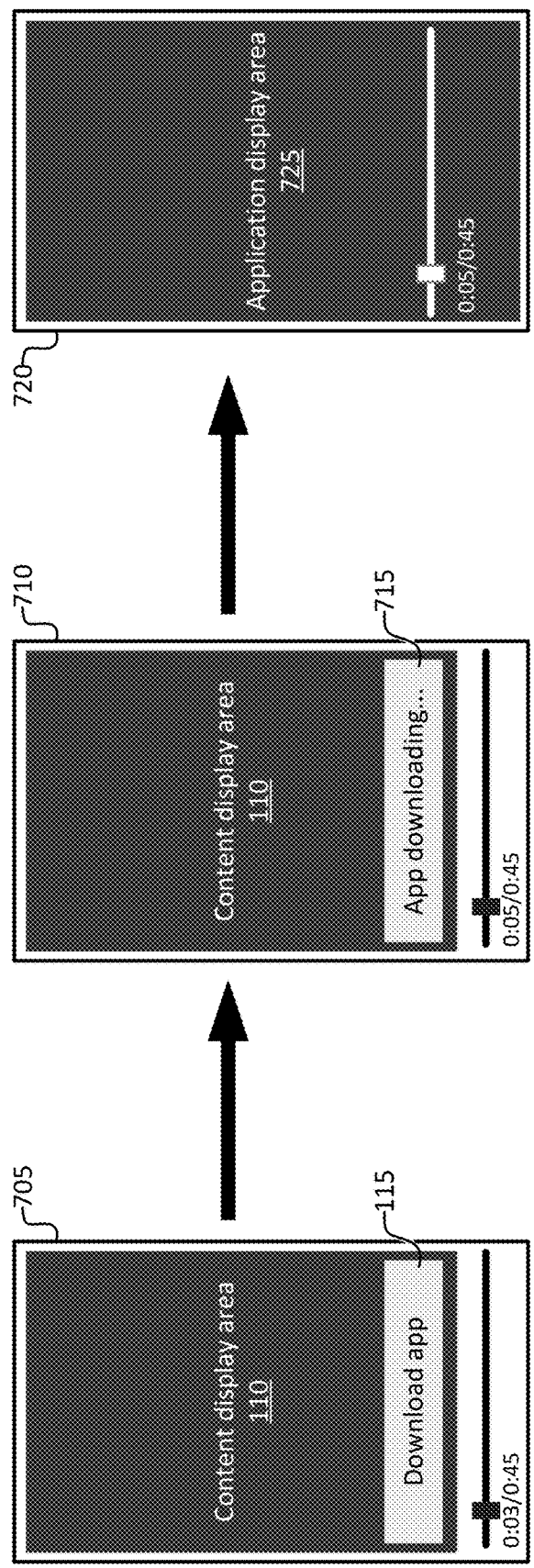
FIGS. 7 and 8 illustrate example user interfaces that may relate to the automatic downloading, installing, and/or launching of applications, in accordance with some implementations described herein.
Figure 8:
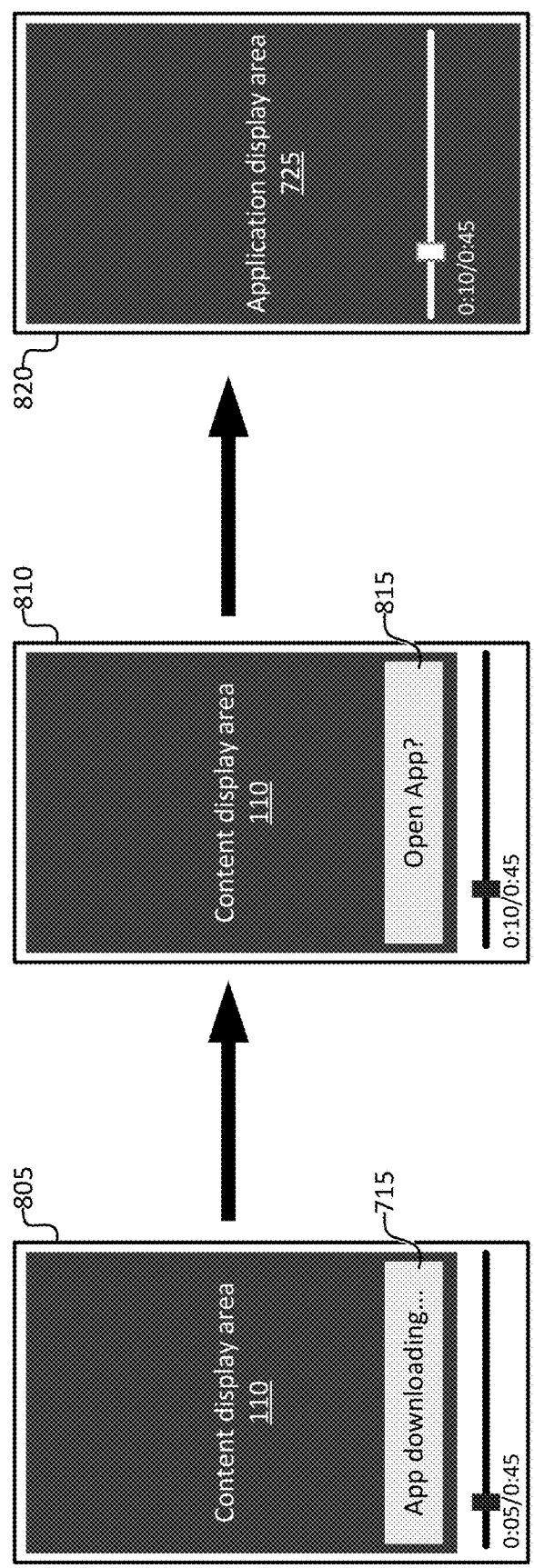

FIGS. 7 and 8 illustrate example user interfaces that may relate to the automatic downloading, installing, and/or launching of applications, in accordance with some implementations described herein. The various user interfaces, shown in these figures may be presented by, for example, user device 205.

As shown in FIG. 7, user interface 705 may include content display area 110, and selectable option 115. As mentioned above, selectable option 115 may be a button that allows a user to request the download, installation, and/or launching of an application. Once selectable option 115 has been selected, user interface 710 may be presented. User interface 710 includes visual notification 715, indicating that the application is currently downloading ("App downloading . . . "). For example, application installation engine 310 may provide information to content playback module 305 indicating the status of the download and/or the installation of the application, based on which content playback module 305 may output visual notification 715. Once the application has installed, and in accordance with some implementations, the application may automatically be launched (e.g., as shown in user interface 720). User interface 720 may include application display area 725, which may include visual elements associated with the application. In accordance with some implementations, application display area 725 may be used to continue the presentation of content previously presented in content display area 110, and may start at a time point corresponding to a time point, of the playing content, when the application was launched.

FIG. 8 illustrates user interfaces of another example of some implementations described herein. For example, as shown, user interface 805 may include content display area 110 and visual notification 715 (described above with respect to FIG. 7). Once the application has finished downloading and installing, user interface 810 may be presented. User interface 810 may include selectable option 815, which may serve to notify a user that the application has been downloaded and installed, and is ready to be launched. Upon selection of selectable option 815, user interface 820 may be displayed. User interface 820 may include application display area 725, which may include visual elements associated with the application. In accordance with some implementations, application display area 725 may be used to continue the presentation of content previously presented in content display area 110, and may start at a time point corresponding to a time point, of the playing content, when the application was launched.

Figure 9:
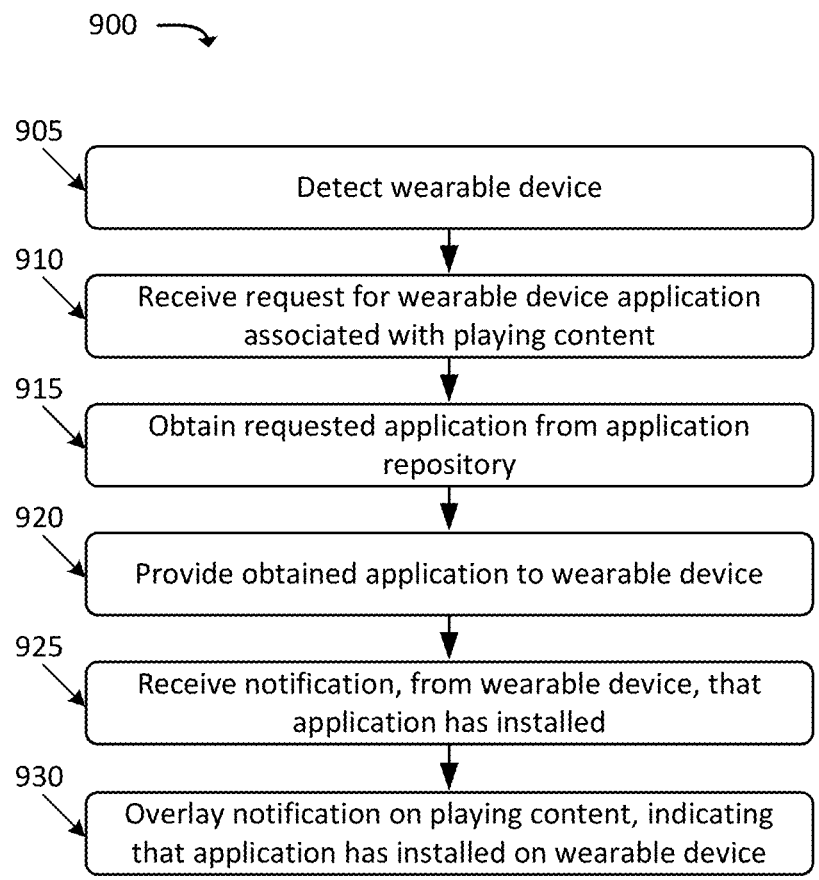
FIG. 9 illustrates a flowchart of an example process for automatically downloading an application to a wearable device.

While examples above are described in the context of a single device (i.e., user device 205), in practice, the above concepts may be practiced on multiple devices. For example, in some implementations, some implementations may utilize user device 205, as well as one or more wearable devices 207, in the automatic downloading, installing, and launching of applications. While many variations are possible, FIG. 9 illustrates a flowchart of one example process 900 for automatically downloading an application to a wearable device.

As shown, process 900 may include detecting (at 905) a wearable device. For example, user device 205 and wearable device 207 may perform a registration process, or a "pairing" process. Based on this registration or pairing, user device 205 and wearable device 207 may determine that information may be based between the devices, such as via a short-range wireless protocol. User device 205 may store information regarding wearable device 207 (e.g., a type of device, such as a watch, glasses, or another type of wearable device; a make and/or model of wearable device 207; an operating system running on wearable device 207, etc.). Application installation engine 310 may provide some or all of the information, regarding wearable device 207, to content playback module 305.

Based on the information regarding wearable device 207, content playback module 305 may present a selectable option to download an application for wearable device 207. That is, in some implementations, content playback module 305 may receive conditional information regarding multiple applications associated with an item of content, such as an application for user device 205 and an application for a wearable device, or for a particular type of wearable device, if such a wearable device is detected. Based on the information regarding the detected wearable device 207, content playback module 305 may select the application associated with the detected wearable device 207 (i.e., in lieu of other applications, such as those associated with user device 205 or with other types of wearable devices), and may present a selectable option to download the selected application. Additionally, or alternatively, application installation engine 310 may use the information, regarding wearable device 207, when receiving a request for an application (e.g., application installation engine 310 may receive a request, from content playback module 305, to download an application, and application installation engine 310 may select the appropriate application for wearable device 207).

Process 900 may also include receiving (at 910) a request for a wearable device application associated with the playing content. For example, application installation engine 310 may receive a request from content playback module 305 for the application. As mentioned above, the request may, in some implementations, specify a particular application (e.g., an application for wearable device 207). In other implementations, the request may be non-specific (e.g., may not necessarily request that the application be a wearable device application), and application installation engine 310 may determine that the application to be downloaded should be a wearable device application, for the detected wearable device 207. Process 900 may further include obtaining (at 915) the requested application from an application repository (e.g., application repository 215).

Process 900 may additionally include providing (at 920) the obtained application to the wearable device. For example, user device 205 (e.g., application installation engine 310 and/or another component of user device 205) may provide the obtained application (e.g., files and/or other resources) to wearable device 207 via a short-range radio connection. In some implementations, wearable device 207 may have access to application repository 215 (e.g., via network 210), and wearable device 207 may obtain the application from application repository 215. In some such implementations, blocks 915 and 920 may not be performed by user device 205.

Process 900 may receive (at 925) a notification, from the wearable device, that the application has installed. For example, application installation engine 310 and/or another component of user device 205 may be in communication with wearable device 207, and may receive a notification from wearable device 207 (e.g., via an API) that the application has been installed on wearable device 207.

Process 900 may also include overlaying (at 930) a notification on the playing content, indicating that the application has been installed on the wearable device. For example, application installation engine 310 may instruct (via an API) content playback module 305 to overlay the notification on the content that is playing. In some implementations, content playback module 305 may present a selectable option to launch the application, on wearable device 207. Based on the selection of the option, content playback module 305 may notify application installation engine 310 that the option has been selected, which may instruct wearable device 207 to launch the application. In some implementations, the application may be automatically launched on wearable device 207 when the application has finished installing on wearable device 207. When the application launches on wearable device 207, content playback module 305 may, in some implementations, pause the presentation of the content, while in other implementations, content playback module 305 may continue the presentation of the content in an uninterrupted manner.

As mentioned above, not all variations or implementations are described herein, and, in practice, other variations or implementations of concepts, described herein, may be used. For example, in some implementations, similar concepts may apply when content is played at a wearable device, and an application may be automatically downloaded, installed, and launched on a user device, based on the presentation of the content at the wearable device.

Figure 10:
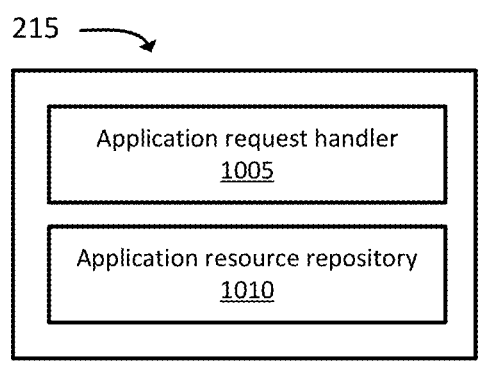
FIG. 10 illustrates another example of example components of an application repository, in accordance with some applications.

FIG. 10 illustrates example functional components of application repository 215. As shown, application repository 215 may include application request handler 1005 and application resource repository 1010. In some implementations, user device 215 may include additional, fewer, different, and/or differently arranged components than shown in FIG. 10. The components shown in FIG. 10 may be implemented as hardware circuitry, software logic, or a combination of hardware and software.

Example functionality of application request handler 1005 and application resource repository 1010 is described below in relation to FIGS. 11 and 12, which illustrate signal flows of example implementations of obtaining and automatically installing and launching applications. Some of the signals, shown in FIGS. 11 and 12, are similar to operations described above and will, for the sake of brevity, not be further described in detail below.

Figure 11:
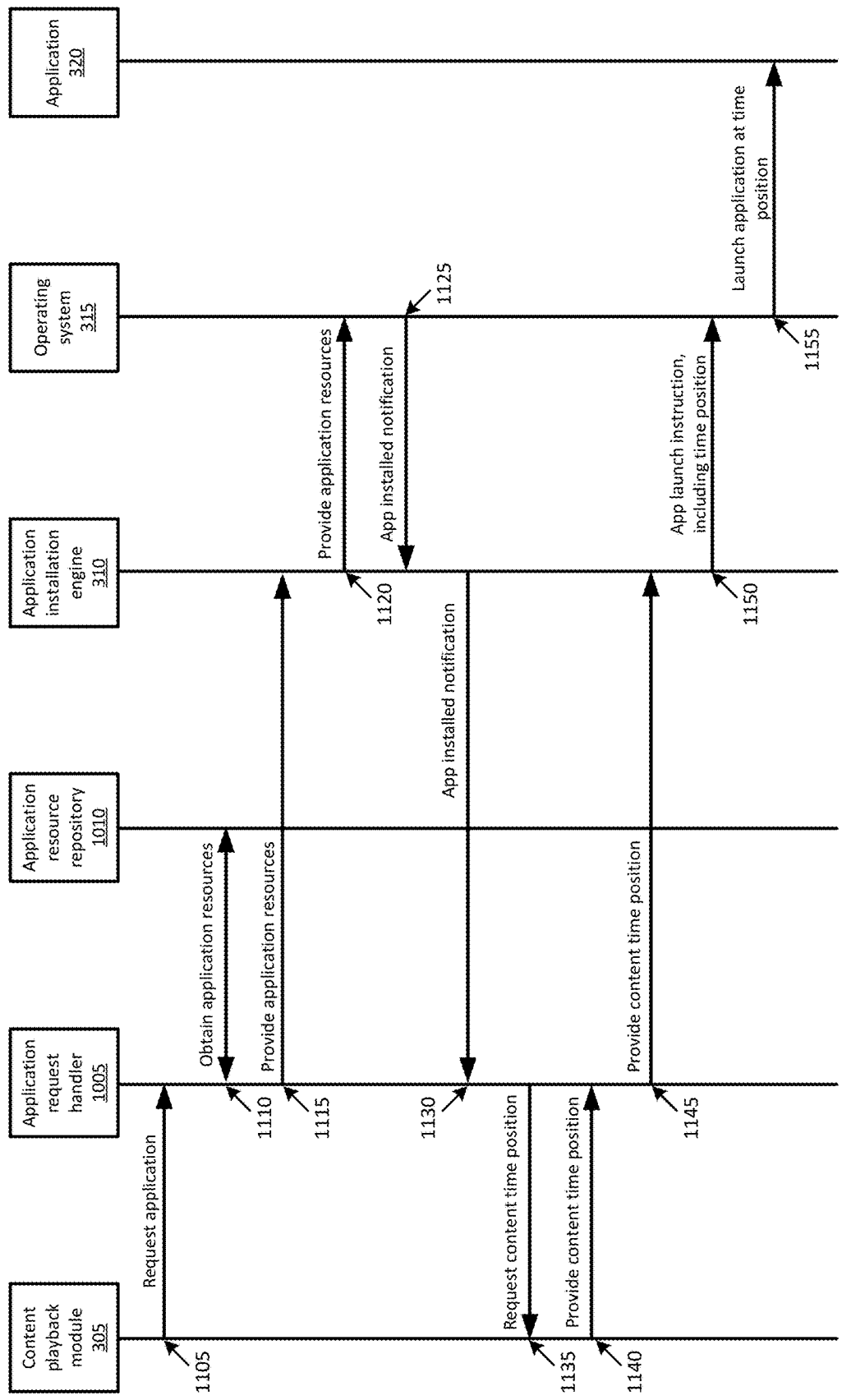
FIGS. 11 and 12 illustrate example signal flows relating to the automatic downloading, installing, and/or launching of applications, in accordance with some implementations described herein.

As shown in FIG. 11, content playback module 305 may output (at 1105) a request for an application. The request may be made via, for example, a URL and/or some other type of resource identifier. In some implementations, the request may be made via an API, which may be implemented using, for example JavaScript and/or some other code. The request may be received by application repository 215 (e.g., by application request handler 1005). Application request handler 1005 may obtain (at 1110) and/or locate resources associated with the application (e.g., installation files, which may be stored by application resource repository 1010), and may provide (at 1115) the application resources to user device 205 (e.g., to application installation engine 310). Application installation engine 310 may provide (at 1120) the application resources to operating system 315, which may install the application using the provided resources. Operating system 315 may output (at 1125) a notification, indicating that the application has been installed.

Application installation engine 310 may output (at 1130) an application installation notification to application request handler 1005). Based on receiving this notification, application request handler 1005 may request (at 1135) a current time position of content, being played by content playback module 305. Content playback module 305 may provide (at 1140) information regarding the current time position to application request handler 1005, which may provide (at 1145) the time position to application installation engine 310. Application installation engine 310 may provide (at 1150) an instruction to launch the application. The instruction may include the received content time position. Operating system 315 may automatically launch (at 1155) application 320, and may pass the time position to application 320 upon launch. This may allow application 320 to continue the content at the particular time position, and/or to provide content that is based on the time position (e.g., web content, buttons, and/or another type of content, that varies based on the time position of the content played by content playback module 305).

Figure 12:
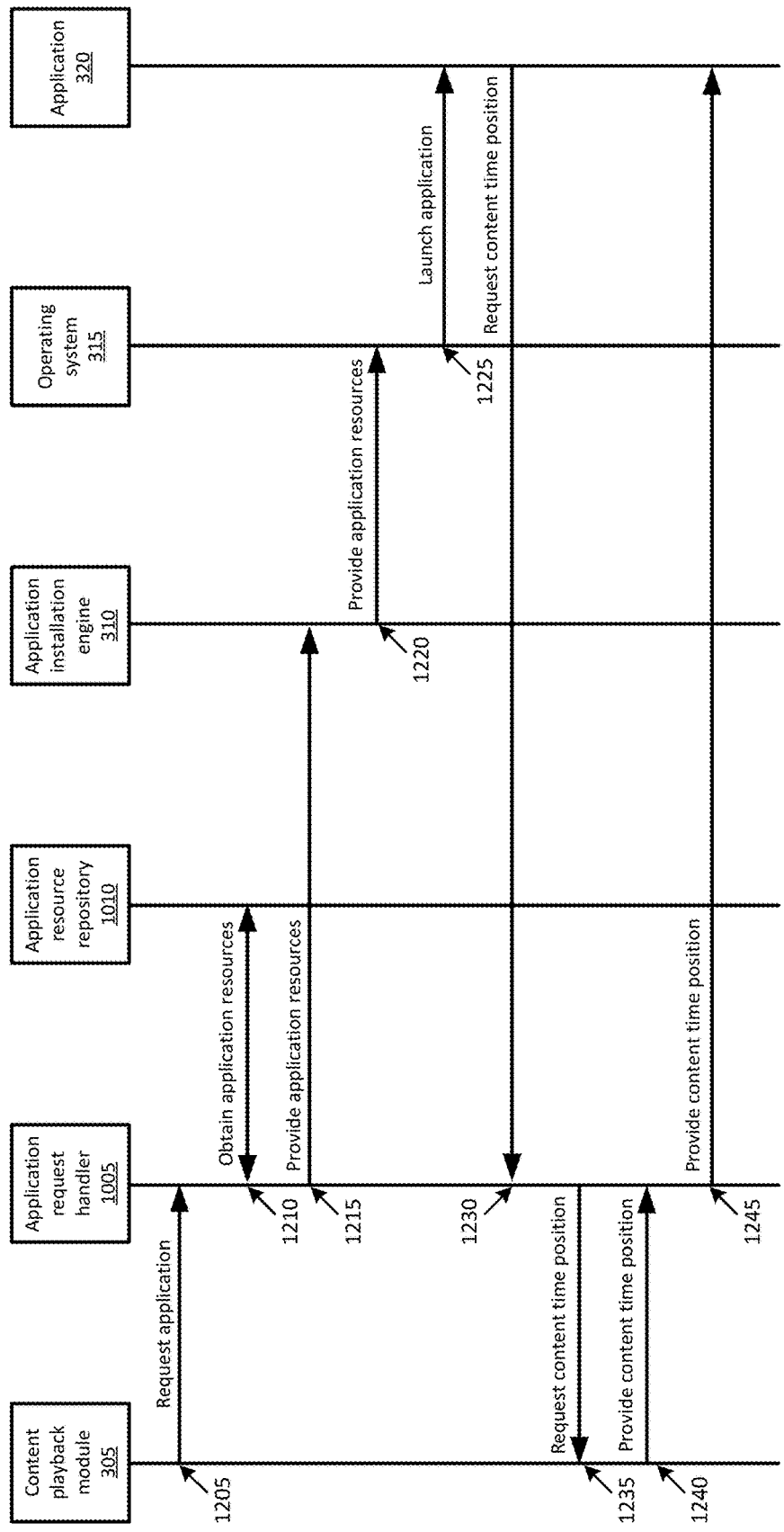

As shown in FIG. 12, content playback module 305 may request (at 1205) an application, application request handler 1005 may obtain (at 1210) the application resources and provide (at 1215) the resources to application installation engine 310, which may provide (at 1220) the resources to operating system 315 for installation. Upon installation, operating system 315 may launch (at 1225) the installed application 320. Upon launch, application 320 may request (at 1230) a current time position associated with the content being played by content playback module 305. Application request handler 1005 may request (at 1235) the current time position from content playback module 305, which may provide (at 1240) the current time position to application request handler 1005. Application request handler 1005 may provide (at 1245) the current time position to application 320, which may use this information to resume the content and/or to provide content that varies based on the time position of the content.

Figure 13:
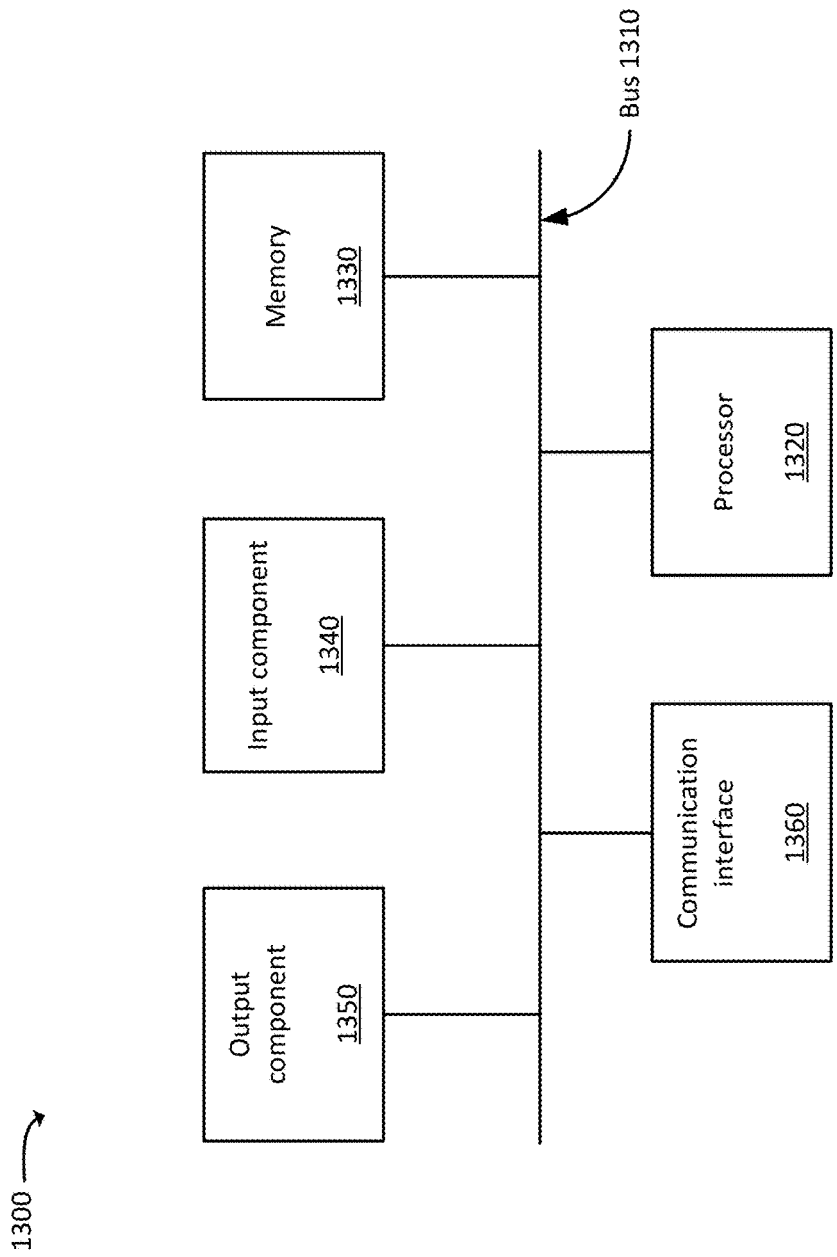
FIG. 13 illustrates example components of a device, in accordance with some implementations described herein.

FIG. 13 is a diagram of example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 4-6, 9, 11, and 12 the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold; may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   presenting content via a display device associated with a user device, wherein the content comprises at least one of:
   audio content,
   video content, or
   game content;
   receiving, by the user device and during the presentation of the content, a request to download an application associated with the content;
   obtaining, by the user device and during the presentation of the content, the application from an application repository, wherein execution of the application on the user device causes the application to present the content on the user device;
   installing, by the user device and during the presentation of the content, the obtained application, wherein the obtaining and installing of the application are performed without interrupting the presentation of the content;
   presenting, by the user device and during the presentation of the content and during the installation of the application, a visual indicator indicating that the application is being installed at the user device;
   detecting, by the user device, that the installation of the application has completed before the presentation of the content has ended; and
   interrupting the presentation of the content to launch, at the user device and based on detecting that the installation of the application has completed, the installed application, wherein the launched application resumes the presentation of the content in the application.

2. The method of claim 1, wherein the content is presented with a selectable option associated with the application, wherein the request to download the application is based on receiving a selection of the selectable option.

3. The method of claim 1, wherein the request to download the application is received automatically, without user interaction requesting that the application be downloaded.

4. The method of claim 1, further comprising:
   presenting a selectable option, during the presentation of content and after the application has been installed, wherein the application is launched further based on a selection of the selectable option.

5. The method of claim 1, further comprising:
   presenting a selectable option concurrently with the presentation of the content, the selectable option being overlaid over a portion of the content,
   wherein the request to download the application is made via a selection of the selectable option,
   wherein the obtaining and installation of the application are performed based on the selection of the selectable option.

6. The method of claim 1, further comprising:
   determining a time at which the application is installed at the user device;
   determining a current time position of the presentation of content at the time that the application is installed at the user device; and
   providing the current time position to the application, to facilitate the resuming of the presentation of the content in the application.

7. A user device, comprising:
   a memory device storing a set of processor-executable instructions; and
   a processor configured to execute the processor-executable instructions, wherein executing the processor-executable instructions causes the user device to:
   present, via a display device associated with the user device, content, wherein the content comprises at least one of:
   audio content,
   video content, or
   game content;
   receive, during the presentation of the content, a request to download an application associated with the content;
   obtain, during the presentation of the content, the application from an application repository, wherein execution of the application on the user device causes the application to present the content on the user device;

install, during the presentation of the content, the obtained application, wherein the obtaining and installing of the application are performed without interrupting the presentation of the content;

present, during the presentation of the content and during the installation of the application, a visual indicator indicating that the application is being installed at the user device;

detect that the installation of the application has completed before the presentation of the content has ended; and interrupt the presentation of the content to launch, based on detecting that the installation of the application has completed, the installed application, wherein the launched application resumes the presentation of the content in the application.

8. The user device of claim 7, wherein the content is presented with a selectable option associated with the application, wherein the request to download the application is based on receiving a selection of the selectable option.

9. The user device of claim 7, wherein the request to download the application is received automatically, without user interaction requesting that the application be downloaded.

10. The user device of claim 7, wherein executing the processor-executable instructions causes the user device to:

present a selectable option, during the presentation of content and after the application has been installed, wherein the application is launched further based on a selection of the selectable option.

11. The user device of claim 7, wherein executing the processor-executable instructions causes the user device to visually present a selectable option concurrently with the presentation of the content, the selectable option being overlaid over a portion of the content, wherein the request to download the application is made via a selection of the selectable option, wherein the obtaining and installation of the application are performed based on the selection of the selectable option.

12. The user device of claim 7, wherein executing the processor-executable instructions further causes the user device to:

determine a time at which the application is installed at the user device;

determine a current time position of the presentation of content at the time that the application is installed at the user device; and provide the current time position to the application, to facilitate the resuming of the presentation of the content in the application.

13. The user device of claim 7, wherein the launching of the installed application is performed automatically, without user interaction requesting that the installed application be launched.

14. A non-transitory computer-readable medium, storing a plurality of processor-executable instructions, which, when executed by one or more processors of a user device, causes the one or more processors to:

present, via a display device associated with the user device, content, wherein the content comprises at least one of:
audio content,
video content, or
game content;

receive, during the presentation of the content, a request to download an application associated with the content;

obtain, during the presentation of the content, the application from an application repository, wherein execution of the application on the user device causes the application to present the content on the user device;

install, during the presentation of the content, the obtained application, wherein the obtaining and installing of the application are performed without interrupting the presentation of the content;

present, during the presentation of the content and during the installation of the application, a visual indicator indicating that the application is being installed at the user device;

detect that the installation of the application has completed before the presentation of the content has ended; and interrupt the presentation of the content to launch, based on detecting that the installation of the application has completed, the installed application, wherein the launched application resumes the presentation of the content in the application.

15. The non-transitory computer-readable medium of claim 14, wherein the content is presented with a selectable option associated with the application, wherein the request to download the application is based on receiving a selection of the selectable option.

16. The non-transitory computer-readable medium of claim 14, wherein the request to download the application is received automatically, without user interaction requesting that the application be downloaded.

17. The non-transitory computer-readable medium of claim 14, wherein executing the processor-executable instructions causes the user device to:

present a selectable option, during the presentation of content and after the application has been installed, wherein the application is launched further based on a selection of the selectable option.

18. The non-transitory computer-readable medium of claim 14, wherein executing the processor-executable instructions causes the user device to visually present a selectable option concurrently with the presentation of the content, the selectable option being overlaid over a portion of the content, wherein the request to download the application is made via a selection of the selectable option, wherein the obtaining and installation of the application are performed based on the selection of the selectable option.

19. The non-transitory computer-readable medium of claim 14, wherein execution of the processor-executable instructions further causes the one or more processors to:

determine a time at which the application is installed at the user device;

determine a current time position of the presentation of content at the time that the application is installed at the user device; and provide the current time position to the application, to facilitate the resuming of the presentation of the content in the application.

20. The non-transitory computer-readable medium of claim 14, wherein the launching of the installed application is performed automatically, without user interaction requesting that the installed application be launched.

* * * * *